US006833960B1

(12) United States Patent
Scarbrough et al.

(10) Patent No.: US 6,833,960 B1
(45) Date of Patent: Dec. 21, 2004

(54) LENTICULAR IMAGING SYSTEM

(75) Inventors: Joel Scott Scarbrough, Burlington, WI (US); Terri Lynn DeBlaey, Cedar Grove, WI (US)

(73) Assignee: Serigraph Inc., West Bend, WI (US)

( * ) Notice: Subject to any disclaimer, the term of this patent is extended or adjusted under 35 U.S.C. 154(b) by 112 days.

(21) Appl. No.: 10/091,923

(22) Filed: Mar. 5, 2002

Related U.S. Application Data

(60) Provisional application No. 60/273,379, filed on Mar. 5, 2001.

(51) Int. Cl.[7] .............................................. G02B 27/10
(52) U.S. Cl. ...................................... 359/619; 359/626
(58) Field of Search ............................... 359/620, 619, 359/621, 625, 626

(56) References Cited

U.S. PATENT DOCUMENTS

| | | | |
|---|---|---|---|
| 4,920,039 A | * 4/1990 | Fotland et al. ............... | 430/324 |
| 5,460,679 A | 10/1995 | Abdel-Kader | |
| 5,642,226 A | * 6/1997 | Rosenthal ..................... | 359/619 |
| 5,644,431 A | * 7/1997 | Magee ......................... | 359/619 |
| 5,699,190 A | * 12/1997 | Young et al. ................. | 359/619 |
| 5,753,344 A | 5/1998 | Jacobsen ...................... | 428/142 |
| 5,933,084 A | * 8/1999 | Ravier et al. ............. | 340/815.73 |
| 6,084,713 A | 7/2000 | Rosenthal .................... | 359/619 |
| 6,091,479 A | 7/2000 | Frosig et al. ................. | 355/22 |
| 6,101,039 A | 8/2000 | Blazey ......................... | 359/619 |
| 6,185,892 B1 | 2/2001 | Calvanella .................. | 52/311.1 |
| 6,256,150 B1 | 7/2001 | Rosenthal .................... | 359/619 |
| 6,277,232 B1 | 8/2001 | Wang et al. ................. | 156/250 |

* cited by examiner

*Primary Examiner*—Ricky Mack
(74) *Attorney, Agent, or Firm*—Godfrey & Kahn, S.C.

(57) ABSTRACT

A lenticular imaging system for viewing printed images on a printed article, the lenticular imaging system creating the illusion of three-dimensional (3-D) images moving or floating across the printed article. The lenticular imaging system of the present invention comprises a substrate with a plurality of images preferably printed on at least one of the surfaces of the substrate and a plurality of spaced-apart convex lenses forming a lenticular lens array on-top of the plurality of images. The images may be centered directly under each of the lenses of the lens array or shifted in relation to the lenses of the lens array creating the appearance of depth, three-dimensionality and motion to a viewer viewing the printed article. In yet another embodiment of the present invention, the images on the substrate are preferably separated from the lenses of the lens array by a fixed distance.

22 Claims, 10 Drawing Sheets

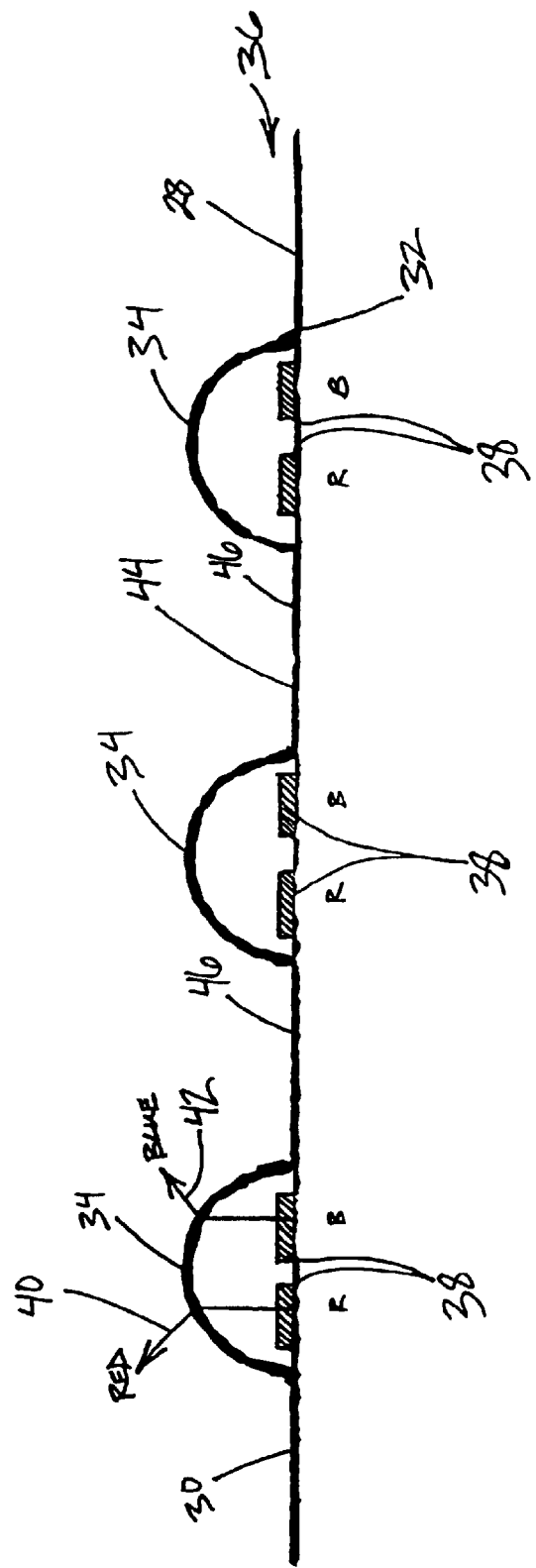

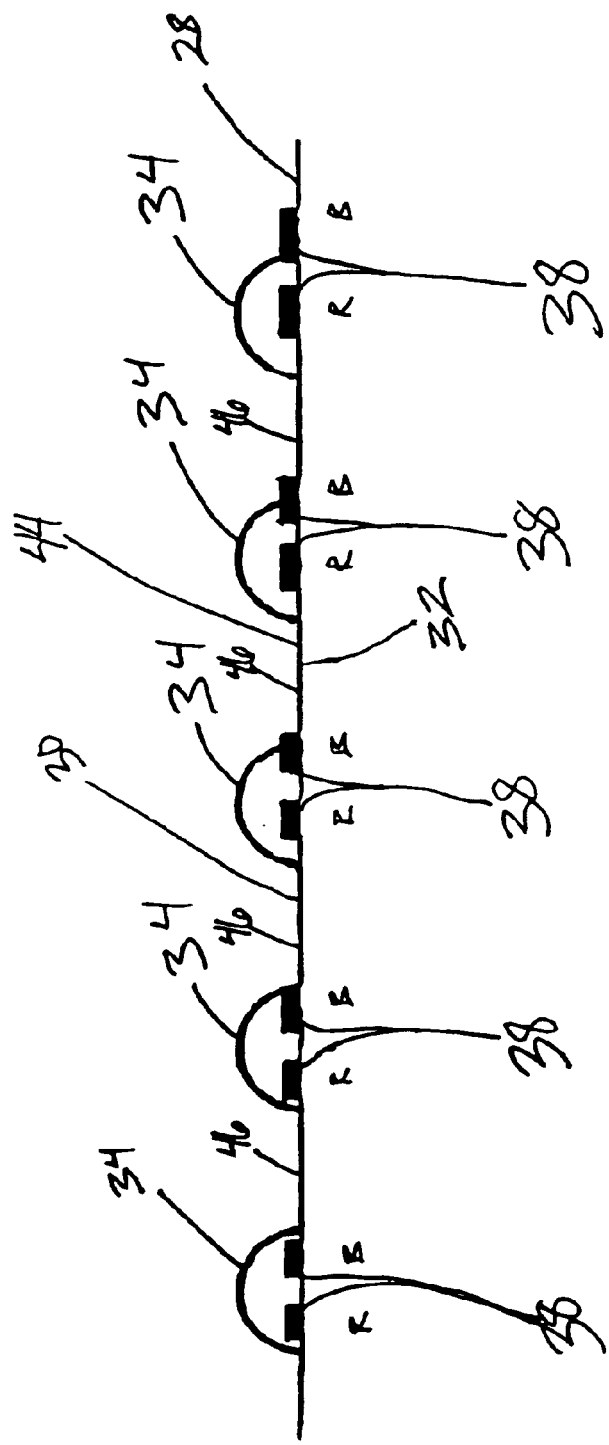

LENTICULAR IMAGING SYSTEM

CROSS-REFERENCE TO RELATED APPLICATIONS

This application claims the benefit of U.S. Provisional Application No. 60/273,379, filed Mar. 5, 2001.

BACKGROUND OF THE INVENTION

The present invention relates generally to lenticular images, and more particularly to a lenticular imaging system for viewing printed images on a printed article, the lenticular imaging system creating the illusion of three-dimensional (3-D) images moving or floating across the printed article.

Lenticular lenses and lenticular imaging systems are well known for use in producing various types of unique optical effects. A lenticular lens system generally includes a transparent sheet having a flat surface on one side thereof and a series of parallel longitudinal protrusions or ridges on the other side thereof creating a series of convex lenses on one side of the transparent sheet that may be applied to a printed sheet or substrate. The lenses are typically formed through injection moldings, extruding embossed or embossing one side of the transparent sheet.

Lenticular image products include an array of lenticular lens elements positioned over a composite image as viewed through the lenticular lens elements. The composite image includes a plurality of images which are interleaved so that a different image is viewed through each lens element and at different viewing angles of each lens element. By moving the product and/or changing the viewing angle, the image changes. With this type of product, the printed image under the lenticular lens array may appear as a floating 3-D image to the viewer.

In forming this 3-D optical effect, various portions of the printed image respectively constitute a right eye view of the image and a left eye view of the image when looking through the lenticular lens array thereby creating the illusion of 3-D vision in the viewer's mind.

Accordingly, it is an object of the present invention to produce printed products, which create the illusion of depth, three-dimensionality, and moving or floating of a printed image printed on a substrate situated beneath an array of printed lenses in the mind of a viewer.

SUMMARY OF THE INVENTION

In one embodiment of the present invention, the lenticular imaging system comprises a substrate having a top surface and a bottom surface, with a plurality of images preferably printed on the top or bottom surfaces of the substrate and a plurality of spaced-apart convex lenses formed on the top or bottom surfaces of the substrate above the plurality of images. The plurality of spaced-apart convex lenses comprise a lenticular lens array that is applied directly over the plurality of images preferably printed on the top or bottom surfaces of the substrate. The images are preferably centered directly under each of the lenses of the lens array and project through the lenses when viewed by a viewer. The convex curvature of the lenses creates the appearance of depth, three-dimensionality and motion to a viewer viewing the printed article.

In another embodiment, the images are shifted in relation to the lenses of the lens array. The images may be shifted left or right so that the images are preferably no longer directly centered under each of the lenses of the lens array. In other words, the spatial frequency of the images is varied providing the appearance of depth, three-dimensionality and motion to a viewer viewing the printed article. Shifting the image lines in relation to the lenses creates the illusion of color shifting or motion in the eyes of a viewer. Images appear to move or "float" back and forth across the substrate.

In yet another embodiment of the present invention, the images on the substrate are preferably separated from the lenses by a fixed distance. As the distance increases toward the focal length of the lenses, the images become more focused and more magnified in the eyes of a viewer. The lenses, thus, magnify and focus the images on the substrate. Due to the focusing attributes of the lenses, the images will appear magnified and exhibit different optical characteristics depending on the angle of view of a viewer.

The lenticular imaging system embodiments of the present invention illustrate the use of a plurality of spaced-apart convex lenses that provide visual changes in images in two and three dimensions. The array of convex lenses provides the illusion of depth, three-dimensionality and motion of the images in the eyes of a viewer. The lenses of the lens array magnify the images on the substrate, and portray the images in 3-D with the additional illusions of movement or floating of images across the substrate.

Various other features, objects, and advantages of the invention will be made apparent to those skilled in the art from the following drawings and detailed description of the invention.

BRIEF DESCRIPTION OF THE DRAWINGS

FIG. 2A is an enlarged fragmentary cross-sectional view of a non-focusing lenticular lens array of linear parallel convex lenses with a plurality of parallel lines printed on a top surface of a substrate in accordance with a first embodiment of the present invention;

FIG. 3A is an enlarged fragmentary cross-sectional view of a third embodiment, similar to the first embodiment of FIG. 2A, but with the plurality of printed parallel lines shifted in relation to the lenticular lens array;

DETAILED DESCRIPTION OF THE INVENTION

Figure 1A:
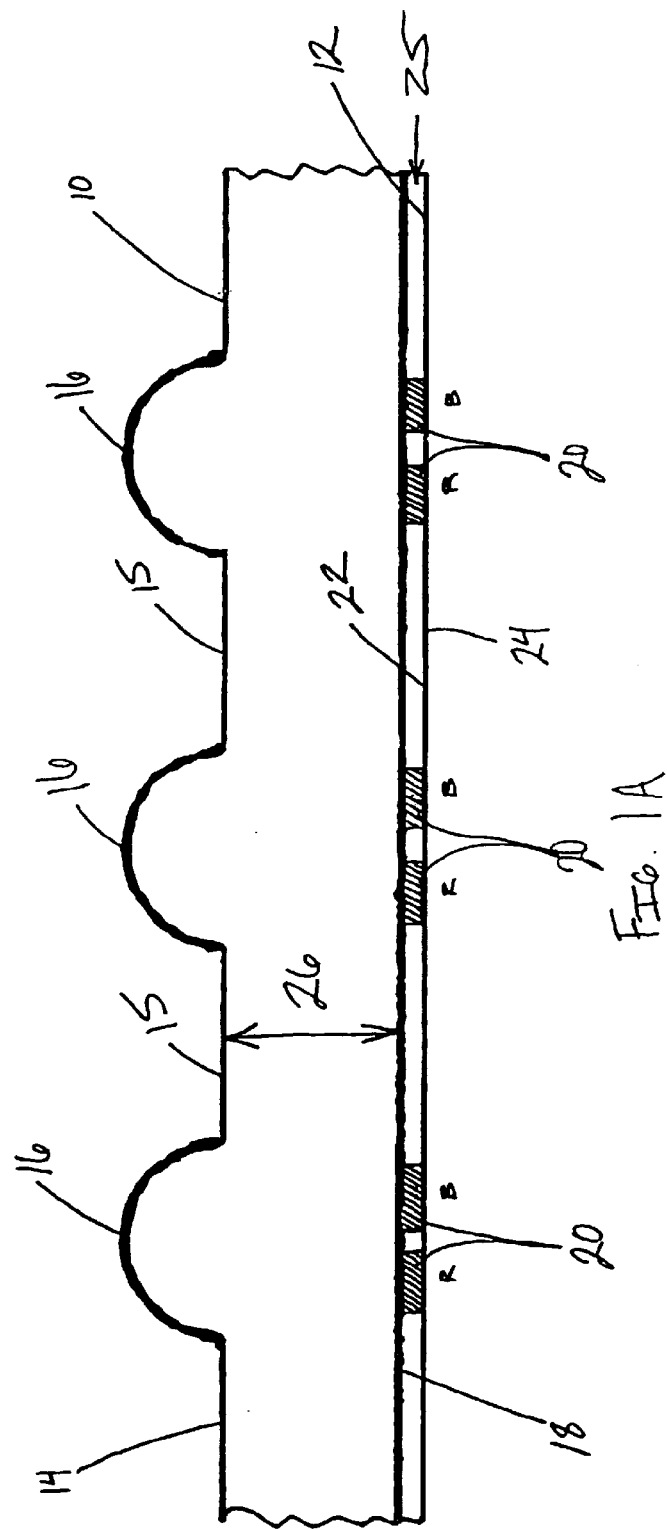
FIG. 1A is an enlarged fragmentary cross-sectional view of a known prior art lenticular lens system showing a focusing lenticular lens array of linear parallel convex lenses with a plurality of parallel lines printed on a top surface of a substrate.
Figure 1B:
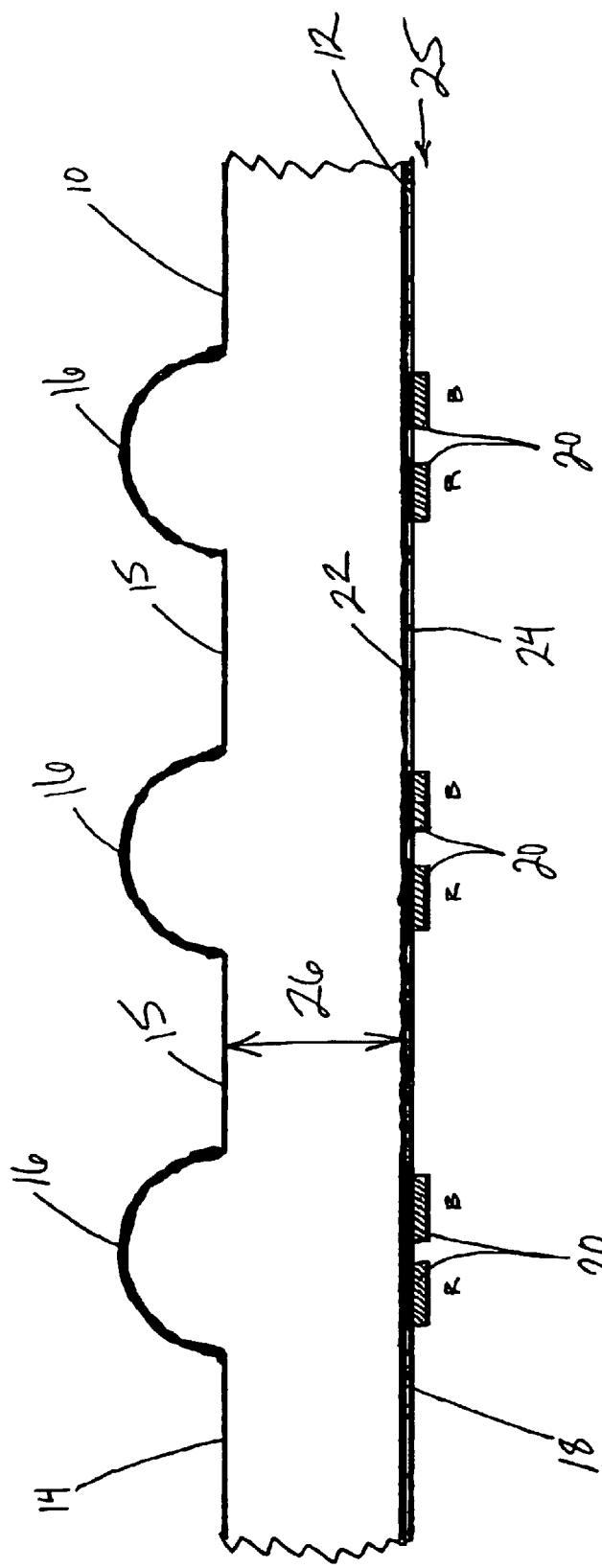
FIG. 1B is an enlarged fragmentary cross-sectional view of a known prior art lenticular lens system similar to FIG. 1A showing a focusing lenticular lens array of linear parallel convex lenses with a plurality of parallel lines printed on a bottom surface of a substrate.

Referring first to FIGS. 1A and 1B, two embodiments of a prior art lenticular imaging system are shown comprising a lenticular lens sheet 10 applied to a top surface 22 of a substrate 12. The lens sheet 10 includes a top surface 14 with a plurality of elongated, parallel, convex lenses 16 comprising a focusing lenticular lens array, and a substantially flat bottom surface 18. The lenses 16 are preferably printed on the top surface 14 of the lenticular lens sheet 10 in a spaced apart relationship, such that there is a substantially flat element 15 between each convex lens 16. The lenticular sheet 10 is preferably made of a thermoplastic material with a thickness 26 approximately equal to the focal length of the lenses 16.

The preferably substantially flat substrate 12 includes a top surface 22 and a bottom surface 24 with images 20 printed on the top surface 22, FIG. 1A, or bottom surface 24, FIG. 1B, for projection through the lenticular lens sheet 10. In addition, the images 20 may be printed on the bottom surface 18 of the lens sheet 10, similar to the embodiment shown in FIG. 1A. The substrate 12 may be made of a transparent material, such as transparent plastic, or a reflective material, such as white paper, or a transparent material coated with a reflective material on the bottom surface 24 thereof. The printed images 20 may be applied to the top 22 or bottom 24 surfaces of the substrate 12, or the bottom surface 18 of the of the lens sheet 10 through silk screening, lithography, flexography and other printing techniques known to those skilled in the art. In the embodiments shown in FIGS. 1A and 1B, the images 20 are a series of parallel colored lines 20, for example red and blue, that lie in a plane 25 beneath the lens sheet 10. The colored lines 20 are preferably centered directly under each of the lenses 16.

The lenses 16 magnify images 20 printed on the top 22 or bottom 24 surfaces of the substrate 12, or on the bottom surface 18 of the lens sheet 10. Light is reflected and refracted from the images as it passes through the lenticular lens sheet 10 to the eyes of a viewer. Due to the focusing attributes of the lenticular lens sheet 10, the images will appear magnified and exhibit different optical characteristics depending on the angle of view of the viewer. The convex curvature of the lenses 16 causes the viewer to see the images in 3-D and in motion due to the viewer's eyes viewing the images at different angles.

Figure 2B:
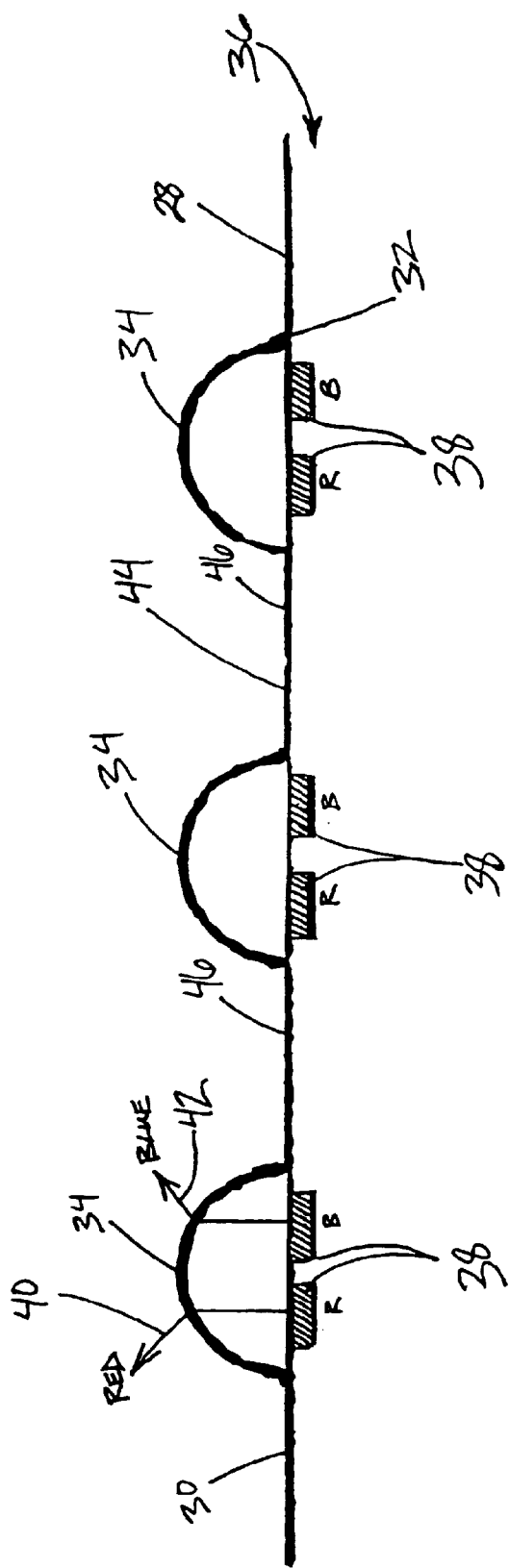
FIG. 2B is an enlarged fragmentary cross-sectional view of a non-focusing lenticular lens array similar to FIG. 2A of linear parallel convex lenses with a plurality of parallel lines printed on a bottom surface of a substrate in accordance with a second embodiment of the present invention.

Referring next to FIGS. 2A and 2B, first and second embodiments of the present invention are shown. These embodiments comprise a substrate 28 having a top surface 30 and a bottom surface 32, with a plurality of spaced-apart, elongated, parallel, convex lenses 34 formed on the top surface 30, FIG. 2A, or bottom surface 32, FIG. 2B, of the substrate 28. The substrate 28 is preferably made of a printable material. For example, the substrate is preferably made of a transparent material, such as transparent plastic, or a reflective material, such as white paper or a transparent material coated with a reflective material on the one surface thereof. The plurality of spaced-apart, elongated, parallel, convex lenses 34 comprise a non-focusing lenticular lens array 44 that is positioned directly over images 38, preferably printed on the top 30 or bottom 32 surfaces of the substrate 28. The lenses 34 are preferably made of a clear thermoplastic or thermoset plastic material and are preferably printed directly on the top surface 30 of the substrate 28 in a spaced-apart relationship, such that there is a substantially flat portion 46 between each lens 34. Printing the lenses 34 directly on the top surface 30 of the substrate 28 provides a very different visual effect than the prior art embodiments shown in FIGS. 1A and 1B. In addition to printing, the lens array 44 may be molded, extruded or embossed on at least one surface of the substrate 28.

As mentioned above, images 38 are preferably printed on the top 30 or bottom 32 surfaces of the substrate 28 for projection through the lenses 34 of the lens array 44. The images 38 are preferably printed to the top 30 or bottom 32 surfaces of the substrate 28 through silk screening, lithography, flexography and other printing techniques known to those skilled in the art. In the embodiments shown in FIGS. 2A and 2B, the images 38 are preferably a series of parallel colored lines 38, for example, red and blue lines, that lie in a plane 36 beneath the lenses 34. The image lines 38 are preferably centered directly under each of the lenses 34. The non-focusing lenses 34 scatter reflected and refracted light passing through the lenses 34, as shown by arrows 40, 42, to provide different colors in the eyes of a viewer viewing the colored images 38 at different angles. This visual effect may also be created by preferably printing a lens array 44 on the bottom surface 32 of the substrate 28, with images 38 printed on the top 30 or bottom 32 surface of the substrate 28. The convex curvature of the lenses 34 also causes a viewer to see the images 38 in 3-D.

Figure 3B:
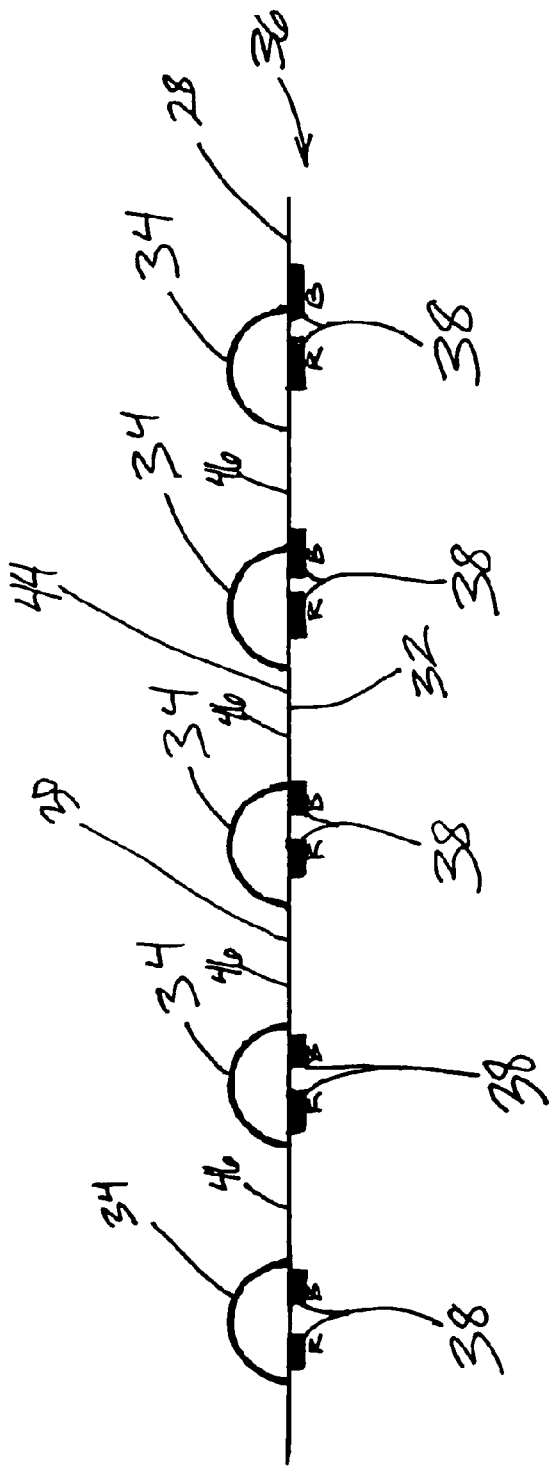
FIG. 3B is an enlarged fragmentary cross-sectional view of a fourth embodiment, similar to the second embodiment of FIG. 2B, but with the plurality of printed parallel lines shifted in relation to the lenticular lens array.

FIGS. 3A and 3B show third and fourth embodiments of the present invention similar to the first and second embodiments of FIGS. 2A and 2B, except that the plurality of preferably printed, parallel image lines 38 are shifted horizontally in relation to the lenses 34 of the lens array 44 positioned above the image lines 38. The image lines 38 may be shifted left or right so that the image lines 38 are preferably no longer directly centered under each of the lenses 34 of the lens array 44. In other words, the spatial frequency of the image lines 38 is varied, so that the right and left eyes of a viewer observe the reflected light from the images differently, providing the appearance of depth, three-dimensionality and motion. By shifting the spatial frequency of the image lines 38, islands of color are created that appear to move or "float" back and forth across the substrate 28, as demonstrated in FIG. 4.

Figure 4:
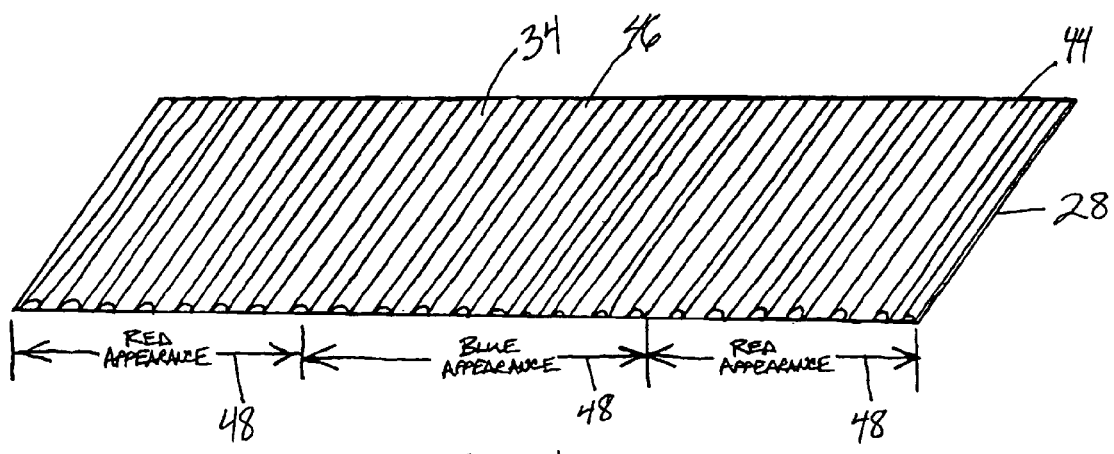
FIG. 4 is an enlarged perspective view of the embodiments of FIGS. 3A and 3B.

FIG. 4 is an enlarged perspective view of the embodiments of FIGS. 3A and 3B. As the image lines 38 are shifted in relation to the lens array 44, different regions of color will appear to a viewer viewing the printed article of FIG. 4. For example, a one percent shift in the image lines means that the red and blue lines are centered directly under the lenses every 100 lenses. Or in other words, if there are 100 lenses per inch of substrate 28, then in every inch of substrate 28 the image created by the image lines will repeat itself. Therefore, regions of red or blue colored lines will be observed moving or floating across the substrate 28 to a viewer of the printed article. In addition, different viewing angles of a viewer will cause the regions of red or blue colored lines 48 to move or float across the substrate 28 as well. Shifting the image lines 38 in relation to the lenses 34 creates the illusion of color shifting or motion in the eyes of a viewer. By shifting the frequency of the image lines 38, islands of color can be created that appear to move or float back and forth across the substrate 28, thereby creating the illusion of color shifting in the eyes of a viewer viewing the printed images from different angles.

Figure 5:
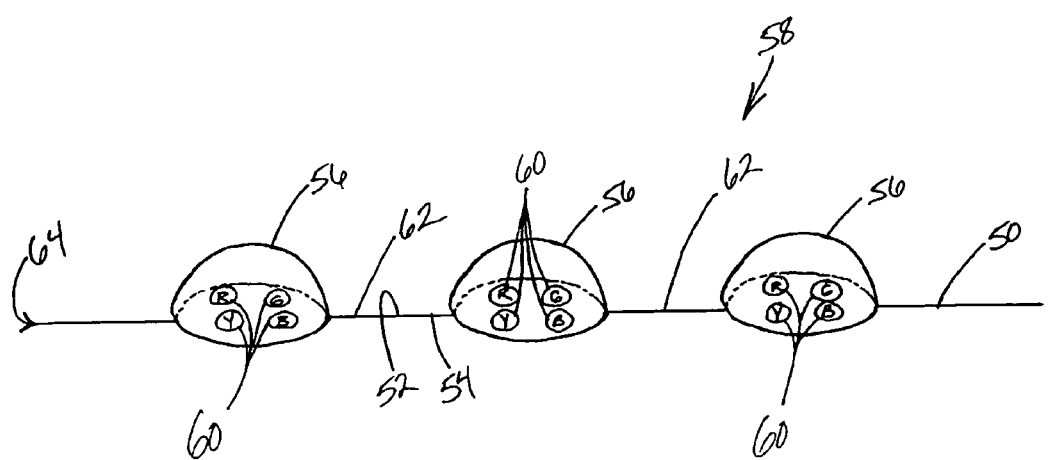
FIG. 5 is an enlarged fragmentary perspective view of a non-focusing lenticular lens array of convex lenses with a plurality of dots printed on a substrate in accordance with a fifth embodiment of the present invention.

Referring next to FIG. 5, yet another embodiment of the present invention is shown. This embodiment comprises a substrate 50 having a top surface 52 and a bottom surface 54, with a plurality of spaced-apart, convex lenses 56 preferably printed on the top surface 52 of the substrate 50. The substrate 50 is preferably made of a transparent material, such as transparent plastic, or a reflective material, such as white paper or a transparent material coated with a reflective material on the one surface thereof. The plurality of spaced-apart, convex lenses 56 comprise a non-focusing lenticular lens array 58 that is positioned directly over an image 60, such as a plurality of colored dots as shown in FIG. 5, that are printed on the top surface 52 of the substrate 50. The lenses 56 are preferably made of a clear thermoplastic or thermoset plastic material and are printed directly on the top surface 52 of the substrate 50 in a spaced-apart relationship, such that there is a substantially flat portion 62 between each of the lenses 56. The embodiment of FIG. 5 provides a different visual effect than the embodiments of FIGS. 1A, 1B, 2A, 2B, 3A and 3B.

As mentioned previously, images 60 are preferably printed on the top or bottom surfaces 52, 54 of the substrate 50 for projection through the lenses 56. The printed images 60 are preferably printed to the top or bottom surface of the substrate 50 through silk screening, lithography, flexography and other printing techniques known to those skilled in the art. In this embodiment, the images 60 are shown as a series of colored dots 60, for example, red, green, yellow, and blue, that lie in a plane 64 beneath the lenses 56 and together form a full-color image in the eyes of the viewer. The colored dots 60 are preferably centered directly under each of the lenses 56. These non-focusing lenses 56 scatter reflected and refracted light passing through the lenses 56 to provide different colors in the eyes of a viewer viewing the colored images 60 at different angles.

Figure 6:
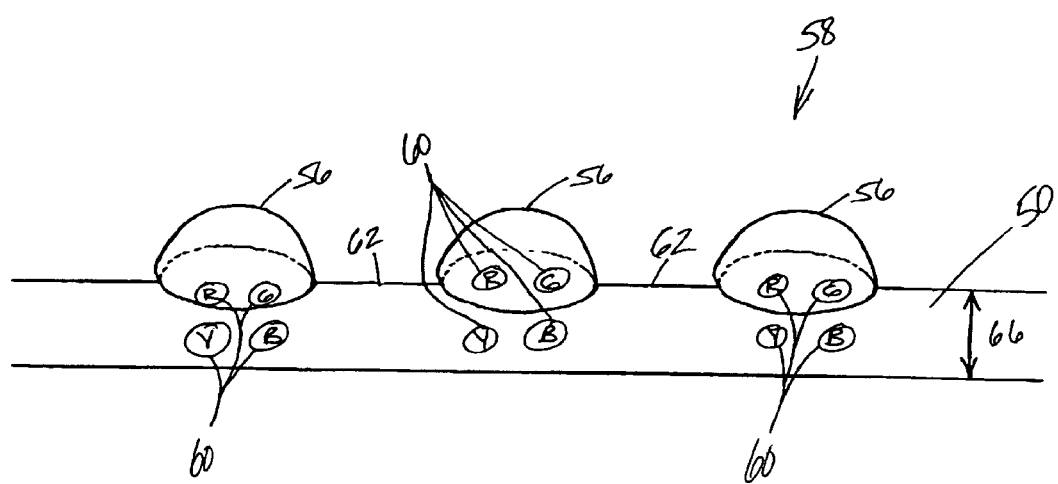
FIG. 6 is an enlarged fragmentary perspective view of a focusing lenticular lens array of convex lenses with a plurality of dots printed on a substrate in accordance with a sixth embodiment of the present invention.

FIG. 6 shows still yet another embodiment of the present invention similar to the embodiment of FIG. 5, except that the printed images 60 are preferably separated from the lenses 56 by a distance 66. As the distance 66 increases toward the focal length of the lenses, the printed images 60 become more focused and more magnified in the eyes of a viewer. The lenses 56, thus, magnify and focus the printed images 60 preferably printed on the substrate 50. Due to the focusing attributes of the lenses 56, the images 60 will appear magnified and exhibit different optical characteristics depending on the angle of view of a viewer. The convex curvature of the lenses 56 also causes a viewer to see the images in 3-D.

Figure 7:
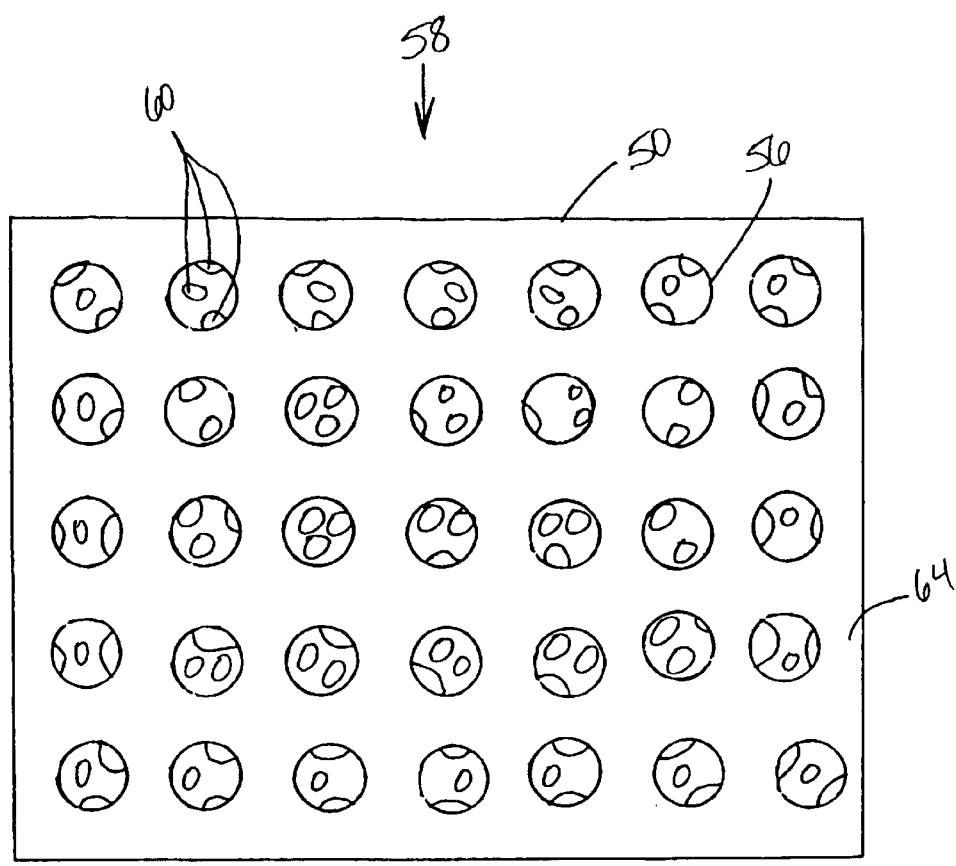
FIG. 7 is an enlarged top plan view of the embodiments of FIGS. 5 and 6 with the plurality of printed dots shifted in relation to the lenticular lens array.

FIG. 7 shows the embodiments of FIGS. 5 and 6 with the plurality of printed colored dots 60 shifted in relation to the lenses 56 so that the dots 60 are no longer centered directly under each of the lenses 56 to create the illusion of color shifting or motion in the eyes of a viewer. By shifting the frequency of the colored dots 60, islands of color can be created that appear to move or float back and forth across the printed substrate 50, thereby creating the illusion of color shifting in the eyes of a viewer viewing the printed images from different angles.

While the invention has been described with reference to preferred embodiments, those skilled in the art will appreciate that certain substitutions, alterations and omissions may be made to the embodiments without departing from the spirit of the invention. Accordingly, the foregoing description is meant to be exemplary only, and should not limit the scope of the invention.

We claim:

1. A printed article comprising:
   a substrate having a top surface and a bottom surface;
   a graphic image layer including at least one graphic image printed on at least one surface of the substrate; and
   a lens array printed on the substrate the graphic image layer, wherein the lens array comprises a plurality of clear, magnifying, convex lenses.

2. The printed article of claim 1, wherein the substrate is a printable substrate.

3. The printed article of claim 1, wherein the at least one graphic image is printed on the top surface of the substrate.

4. The printed article of claim 1, wherein the at least one graphic image is printed on the bottom surface of the substrate.

5. The printed article of claim 1, wherein the lens array is printed on top of the graphic image layer.

6. The printed article of claim 1, wherein the lenses are dots having a semi-circular cross-section printed from a clear ink.

7. The printed article of claim 6, wherein the lenses are printed with clear ink through digital, flexography, gravure, lithography, offset lithography and other printing techniques known to those skilled in the art.

8. The printed article of claim 1, wherein the lenses are lines having a semi-circular cross-section printed from a clear ink.

9. The printed article of claim 1, wherein the at least one graphic is centered directly under each lens of the lens array.

10. The printed article of claim 1, wherein the at least one graphic is shifted horizontally in relation to the lenses of the lens array.

11. The printed article of claim 8, wherein the lenses are printed with clear ink through digital, flexography, gravure, lithography, offset lithography and other printing techniques known to those skilled in the art.

12. A lenticular imaging system comprising:
    a substrate having a top surface and a bottom surface;
    a graphic image layer including a plurality of graphic images printed on at least one surface of the substrate; and
    a lenticular lens array printed on the graphic image layer, wherein the lenticular lens array comprises a plurality of clear, magnifying, elongated, parallel, convex lenses.

13. The lenticular imaging system of claim 12, wherein the plurality of graphic images are centered directly under each lens of the lens array.

14. The lenticular imaging system of claim 12, wherein the plurality of graphic images are shifted horizontally in relation to the lenses of the lens array.

15. The lenticular imaging system of claim 12, wherein the plurality of clear, magnifying, elongated, parallel, convex lenses are non-focusing lenses.

16. The lenticular imaging system of claim 12, wherein the plurality of clear, magnifying, elongated, parallel, convex lenses are spaced-apart by a fixed distance from the plurality of graphic images printed on at least one surface of the substrate.

17. The lenticular imaging system of claim 16, wherein the plurality of clear, magnifying elongated, parallel, convex lenses are focusing lenses.

18. The lenticular imaging system of claim 12, wherein the lenticular lens array is printed on top of the graphic image layer.

19. A method of making a printed article, the steps comprising:

providing a printable substrate with a top surface and a bottom surface;

applying at least one graphic image on at least one surface of the substrate; and printing a lens array on at least one surface of the substrate above the at least one graphic image, wherein the lens array comprises a plurality of clear, magnifying, convex lenses.

20. A lenticular imaging system comprising:

a substrate having a top surface and a bottom surface;

a graphic image layer including a plurality of graphic images printed on at least one surface of the substrate; and a lenticular lens array printed on the graphic image layer, wherein the lenticular lens array comprises a plurality of clear, magnifying, circular, convex lenses.

21. A printed article comprising:

a substrate having a top surface and a bottom surface;

a graphic image layer including at least one graphic image printed on at least one surface of the substrate; and a lens array printed on at least one surface of the substrate opposite the graphic image layer, wherein the lens array comprises a plurality of clear, magnifying, convex lenses.

22. A printed article comprising:

a substrate having a top surface and a bottom surface;

a graphic image layer including at least one graphic image printed on at least one surface of the substrate;

a transparent layer applied to the graphic image layer; and a lens array printed on the transparent layer, wherein the lens array comprises a plurality of clear, magnifying, convex lenses.

\* \* \* \* \*